Figure 1:
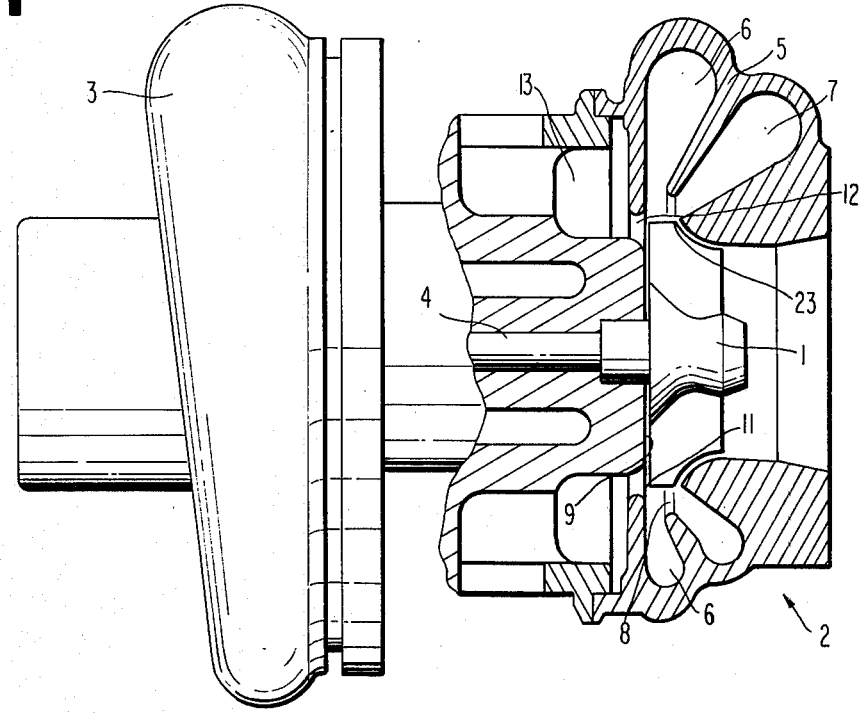

United States Patent [19]

Grohn

[11] 4,355,503
[45] Oct. 26, 1982

[54] EXHAUST GAS TURBOCHARGER

[75] Inventor: Michael Grohn, Esslingen, Fed. Rep. of Germany

[73] Assignee: Daimler-Benz Aktiengesellschaft, Stuttgart, Fed. Rep. of Germany

[21] Appl. No.: 110,702

[22] Filed: Jan. 9, 1980

[30] Foreign Application Priority Data

Jan. 12, 1979 [DE] Fed. Rep. of Germany ....... 2901041

[51] Int. Cl.³ ............................................. F02B 37/00
[52] U.S. Cl. ....................................... 60/602; 60/605; 417/407
[58] Field of Search ................. 60/600, 601, 602, 603, 60/605; 415/144, 145, 183, 184; 417/407

[56] References Cited

U.S. PATENT DOCUMENTS

| 3,355,878 | 12/1967 | Birmann | 60/602 X |
| 3,975,911 | 8/1976 | Morgulis et al. | 60/602 |
| 4,179,892 | 12/1979 | Heydrich | 60/605 |
| 4,215,550 | 8/1980 | Dinger et al. | 60/605 X |

FOREIGN PATENT DOCUMENTS

| 2285514 | 5/1976 | France | 60/602 |
| 471468 | 9/1975 | U.S.S.R. | 60/605 |

*Primary Examiner*—Michael Koczo
*Attorney, Agent, or Firm*—Paul M. Craig, Jr.

[57] ABSTRACT

An exhaust gas turbocharger having inlet channels combined only directly ahead of a turbine rotor at the periphery thereof. An annular gap is arranged within the area in which the back surface and an periphery of the turbine rotor form a circumferential circular edge. A part of the exhaust gas flows from the spiral housing through the annular gap into an annular channel arranged at the rotor back surface, from which branch off a return line to the charging air channel of the compressor, and a by-pass line to a turbine exhaust gas line, by-passing the turbine.

18 Claims, 2 Drawing Figures

EXHAUST GAS TURBOCHARGER

The present invention relates to an exhaust gas turbocharger, especially with pulse turbocharging for vehicle engines and with a corresponding multi-duct or multi-channel spiral housing of the exhaust gas turbine, whose inlet channels are combined only directly ahead of a turbine rotor at the periphery thereof.

With the supercharging of vehicle engines by means of a turbocharger, it has proven as appropriate by reason of the large rotational speed range of the engines, to provide a control of the exhaust gas turbocharger. It has also proved advantageous for that purpose to provide a turbine by-pass because the operational behavior of the supercharged engine can be favorably influenced therewith.

Furthermore, multi-channel exhaust gas installations are used in order to realize a pulse turbocharging whose advantages are unquestionable for the vehicle engine. Two-channel or two-duct turbine housings are used therefor as a rule because they enable nearly undisturbed charging changes of the individual cylinders without significant reaction or feed-back from one exhaust gas connection onto the other.

It is also known to utilize with diesel engines the external exhaust gas recirculation for the reduction of the nitrogen oxides in the exhaust gas.

It is necessary in connection therewith to provide, in addition to the turbine by-pass, a further bifurcation for the exhaust gas return up to the rotor inlet of the turbines. This encounters enormous difficulties in particular with multi-channel or multi-ducted exhaust gas installations since a mutual influencing of the exhaust gas channels by the exhaust gas feedback valves or by-pass valves is to be avoided in every case.

It is the aim of the present invention to avoid in multi-channel or multi-ducted spiral housings an influencing of the individual exhaust gas connections by a particular valve arrangement.

The underlying problems are solved by the present invention in that, within an area in which the rotor back surface and the periphery of the turbine rotor form a circumferential circular edge, an annular gap is provided, through which a part of the exhaust gas flows out of the spiral housing of the exhaust gas turbine into an annular channel arranged at the rotor back surface, from which a feedback line branches off to the charging air channel of the compressor and a by-pass line by-passing the turbine to the turbine exhaust gas line. For the control of a ratio of the exhaust gas partial streams, according to another feature of the present invention, a turbine by-pass diaphragm-valve controlled by the supercharging or exhaust gas pressure may be arranged in the turbine by-pass line, and an exhaust gas recirculation valve may be arranged in the exhaust gas return line which is controlled in dependence on engine-specific magnitudes, for example, in dependence on the mean effective pressure or charging pressure as well as the rotational speed. Furthermore, a throttle valve may be arranged in the turbine exhaust gas line which is also controlled in dependence on magnitudes of the engine. By actuating this throttle valve which is arranged in the exhaust gas stream downstream of the turbine rotor, the rate of exhaust gas return flow can be controlled. This throttle valve is intended to bring about at low loads of the engine an ever-increasing throttling of the exhaust gas stream in the turbine exhaust gas line and therewith a higher exhaust gas counter-pressure, as a result of which the rate of return flow of the exhaust gas is increased.

For purposes of controlling the exhaust gas quantity ratio in the turbine by-pass line, the diaphragm-valve installed therein is controlled in such a manner that it is closed at low load and is increasingly opened at higher load, approximately from ⅓ to full load.

The exhaust gas recirculation valve in the exhaust gas return line, in contrast thereto, is so controlled that it is opened at low load and is increasingly closed at higher load until it is fully closed at a load which corresponds to about ⅔ of the full load.

The control of the valve may take place mechanically, electrically, electronically, pneumatically or hydraulically.

Such housings with this type of an annular gap may also be used without an exhaust gas return, if so desired.

Accordingly, it is an object of the present invention to provide an exhaust gas turbocharger which avoids by simple means the aforementioned shortcomings and drawbacks encountered in the prior art.

Another object of the present invention resides in an exhaust gas turbocharger for vehicle engines which avoids mutual interference from the respective exhaust gas connections of the individual engine cylinders.

A further object of the present invention resides in an exhaust gas turbocharger which permits pulse turbocharging of vehicle engines, yet requires only a simple control that can be readily realized by simple means.

A still further object of the present invention resides in an exhaust gas turbocharger for vehicle engines which optimizes the operation at different loads and different rotational speeds without problems of mutual interference from the respective cylinders of the engine.

Figure 2:
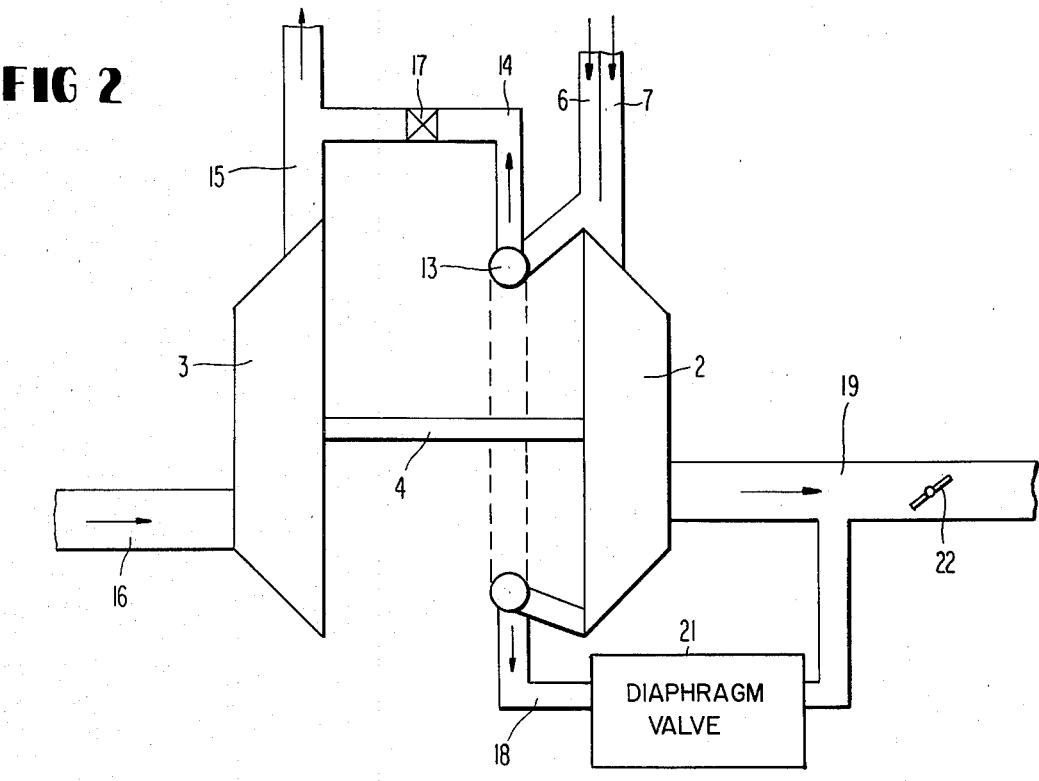

These and further objects, features and advantages of the present invention will become more apparent from the following description when taken in connection with the accompanying drawing which shows, for purposes of illustration only, one embodiment in accordance with the present invention, and wherein:

FIG. 1 is an elevational view illustrating the contours of an exhaust gas turbocharger in accordance with the present invention which is shown in axial cross section within the area of the exhaust gas turbine; and FIG. 2 is a schematic diagram of a system of compressor and turbine of an exhaust gas turbocharger with the associated lines according to the present invention.

Referring now to the drawing wherein like reference numerals are used throughout the two views to designate like parts, in the exhaust gas turbocharger illustrated in the drawing, the turbine rotor 1 of an exhaust gas turbine generally designated by reference numeral 2 is connected with the rotor (not shown) of a compressor 3 by a common shaft 4. The exhaust gas turbine 2 includes a two-channel or two-duct spiral housing 5 with a first inlet channel 6 and with a second inlet channel 7. The inlet channels 6 and 7 combine shortly before reaching the periphery 8 of a turbine rotor 1. Within an area in which a rotor back-surface 9 and the periphery 8 of the turbine rotor 1 form a circumferential circular edge 11, an annular gap 12 is provided through which a part of the exhaust gas flows from the spiral housing 5 into an annular channel 13 arranged at the rotor back-surface 9, from which an exhaust return line 14 leads to the supercharging air channel 15, which conducts air sucked-in and compressed by the compressor 3 by way of an air suction channel 16 to the suction line of the engine. An exhaust gas recirculation valve 17 is located in the exhaust gas return line 14 which is opened at the engine operating points, at which an external exhaust gas feedback is permissive for combustion reasons. This is primarily the case at low and medium loads.

The annular gap and the annular channel may also begin, under certain circumstances, in the spiral housing 5 of the turbine 2 at that place, at which the turbine rotor 1 passes over from the periphery 8 into the area 23 of smaller outside diameters.

Additionally, a by-pass line 18 branches off from the annular channel 13, which by-passes the exhaust gas turbine 2 and which terminates in a turbine exhaust gas line 19. A turbine by-pass valve 21 is disposed in the by-pass line 18, which is controlled, for example, by the supercharging or exhaust gas pressure. The turbine by-pass valve 21 is opened essentially at middle and high loads.

A throttle valve 22 is disposed in the turbine exhaust gas line 19 downstream of the discharge of the by-pass line 18, which is controlled by the load input of the engine. The rate of exhaust gas return flow can additionally be influenced by this control valve 22. The valve 22 makes it possible to establish, at low loads of the engine, a higher exhaust gas counter-pressure and therewith higher rates of exhaust gas recirculation.

The control of the valves can be realized electrically, electronically, pneumatically, hydraulically or mechanically.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all changes and modifications as are encompassed by the scope of the appended claims.

I claim:

1. An exhaust gas turbocharger for a vehicle engine, the exhaust gas turbocharger including a turbine means, a compressor means, the turbine means including a rotor means operatively connected to the compressor means, and a spiral housing means, a plurality of inlet channel means provided in said spiral housing means, the inlet channel means are combined only directly ahead of and at a periphery of the turbine rotor means, characterized in that a circumferential substantially circular edge is formed in an outer surface of the rotor means, annular channel means are provided for conducting a flow of exhaust gases, and annular gap is provided within an area of the circular edge for enabling a part of the exhaust gases to flow from the spiral housing means into the annular channel means, the compressor means includes a charging air channel means, a return line communicating the annular channel means with the charging air channel means, a turbine exhaust gas line is provided, and a bypass line means for bypassing the turbine means leads to the turbine exhaust gas line, and in that said return line and the bypass line means branch off from the annular channel means.

2. An exhaust gas turbocharger according to claim 1, wherein the exhaust gas turbocharger comprises means for pulse turbocharging of the vehicle engine.

3. An exhaust gas turbocharger according to claim 1, characterized in that the outer surface of the rotor means is a rotor back surface, the annular gap is provided within an area in which the rotor backsurface and a periphery of the turbine rotor means form the circumferential, substantially circular edge.

4. An exhaust gas turbocharger for a vehicle engine, the exhaust gas turbocharger including a turbine means, a compressor means, the turbine means including a rotor means operatively connected to the compressor means, and a spiral housing means, a plurality of inlet channel means provided in said spiral housing means, the inlet channel means are combined only directly ahead of and at a periphery of the turbine rotor means, characterized in that a circumferential substantially circular edge is formed in an outer surface of the rotor means, annular channel means are provided for conducting a flow of exhaust gases, and annular gap is provided within an area of the circular edge for enabling a part of the exhaust gases to flow from the spiral housing means into the annular channel means, the compressor means includes a charging air channel means, a return line communicating the annular channel means with the charging air channel means, a turbine exhaust gas line is provided, and a bypass line means for bypassing the turbine means leads to the turbine exhaust gas line, said return line and the bypass line means branch off from the annular channel means, and in that the annular gap and annular channel means begin in the spiral housing means of the turbine means at a place at which the rotor means of the turbine means passes over from the periphery into the area of smaller outside diameter.

5. An exhaust gas turbocharger according to one of claims 1, 2, 3, or 4, characterized in that a throttle valve means is arranged in the turbine exhaust gas line, and comprising means for controlling the throttle valve means in dependence on specific engine operating parameter magnitudes.

6. An exhaust gas turbocharger according to claim 5, characterized in that the specific engine magnitude is at least one of mean effective pressure and rotational speed of the engine.

7. An exhaust gas turbocharger according to claim 5, characterized in that the specific engine magnitudes are mean effective pressures and rotational speed of the engine.

8. An exhaust gas turbocharger according to claim 6, characterized in that a by-pass valve means is arranged in the turbine by-pass line means, and an exhaust gas recirculation valve means is arranged in the exhaust gas return line and comprising means for controlling the exhaust gas recirculation valve means in dependence on the specific engine operating parameter magnitudes.

9. An exhaust gas turbocharger according to claim 8, characterized in that the by-pass valve means is a diaphragm valve.

10. An exhaust gas turbocharger according to claim 8, comprising means for controlling the turbine by-pass valve means in dependence on supercharging pressure.

11. An exhaust gas turbocharger according to claim 8, comprising means for controlling the turbine by-pass valve means to be closed at low load and increasingly opened at middle and higher loads of the engine.

12. An exhaust gas turbocharger according to claim 11, wherein the exhaust gas recirculation valve means comprises means for opening the exhaust gas recirculation means at low load and increasingly closing at higher loads of the engine.

13. An exhaust gas turbocharger according to one of claims 1, 2, 3 or 4, characterized in that by-pass valve means is arranged in the turbine by-pass line means, and an exhaust gas recirculation valve means is arranged in the exhaust gas return line and comprising means for controlling the exhaust gas recirculation valve means in dependence on the specific engine operating parameter magnitudes.

14. An exhaust gas turbocharger according to claim 13, comprising means for controlling the turbine by-pass valve means in dependence on supercharging pressure.

15. An exhaust gas turbocharger according to claim 13, comprising means for controlling the turbine by-pass valve means to be closed at low load and increasingly opened at middle and higher loads of the engine.

16. An exhaust gas turbocharger according to claim 13, wherein the exhaust gas return valve means comprises means for opening the exhaust gas recirculation means at low load and increasingly closing at higher loads.

17. An exhaust gas turbocharger according to claim 8, comprising means for controlling the turbine bypass valve means in dependence on exhaust gas pressure.

18. An exhaust gas turbocharger according to claim 13, comprising means for controlling the turbine bypass valve means in dependence on exhaust gas pressure.

* * * * *